W. J. WHITE.
AUTOMATIC SEED COTTON CLEANER.
APPLICATION FILED DEC. 4, 1915.
1,194,261.
Patented Aug. 8, 1916.
3 SHEETS—SHEET 3.
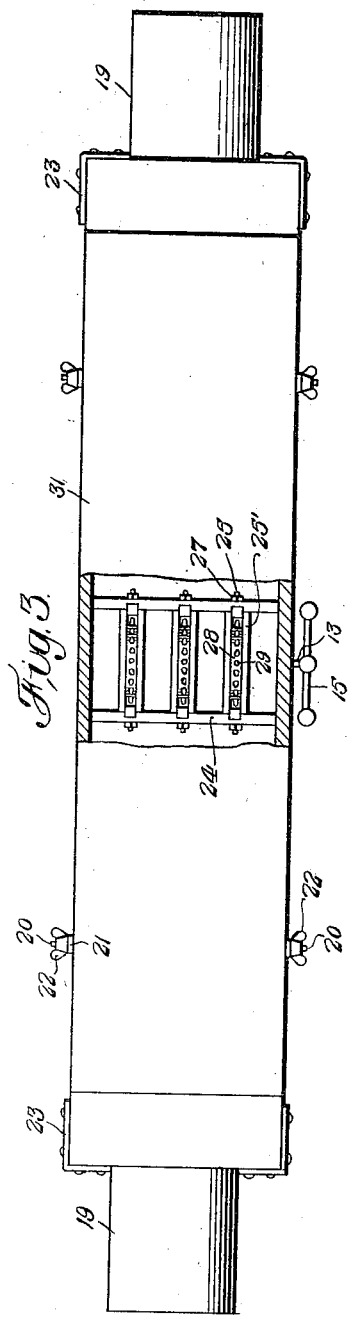
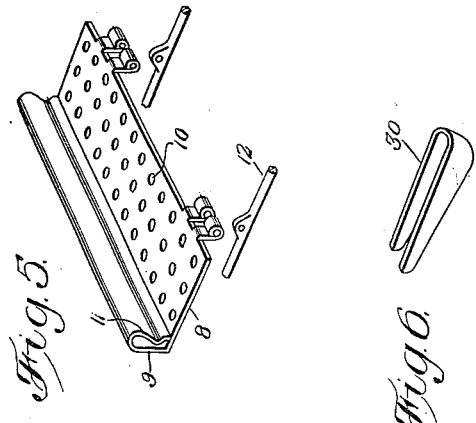
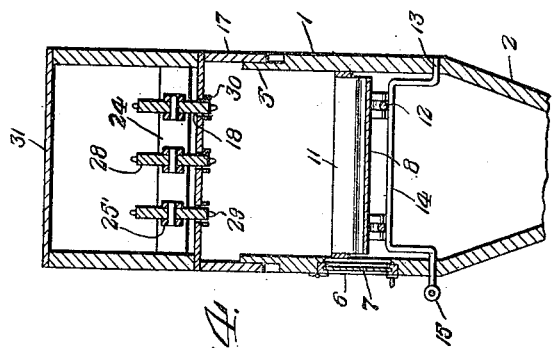
Witness
J H Crawford
Inventor
W. J. White,
By Victor J. Evans
Attorney

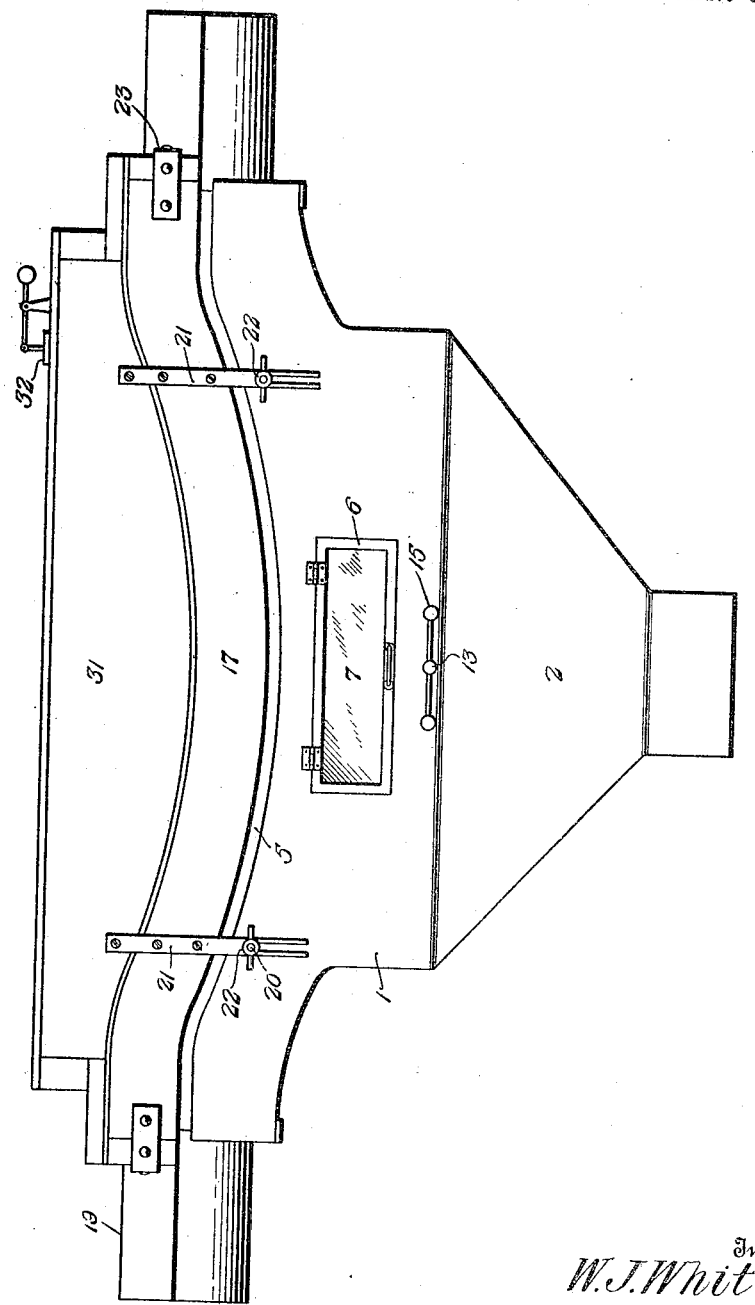

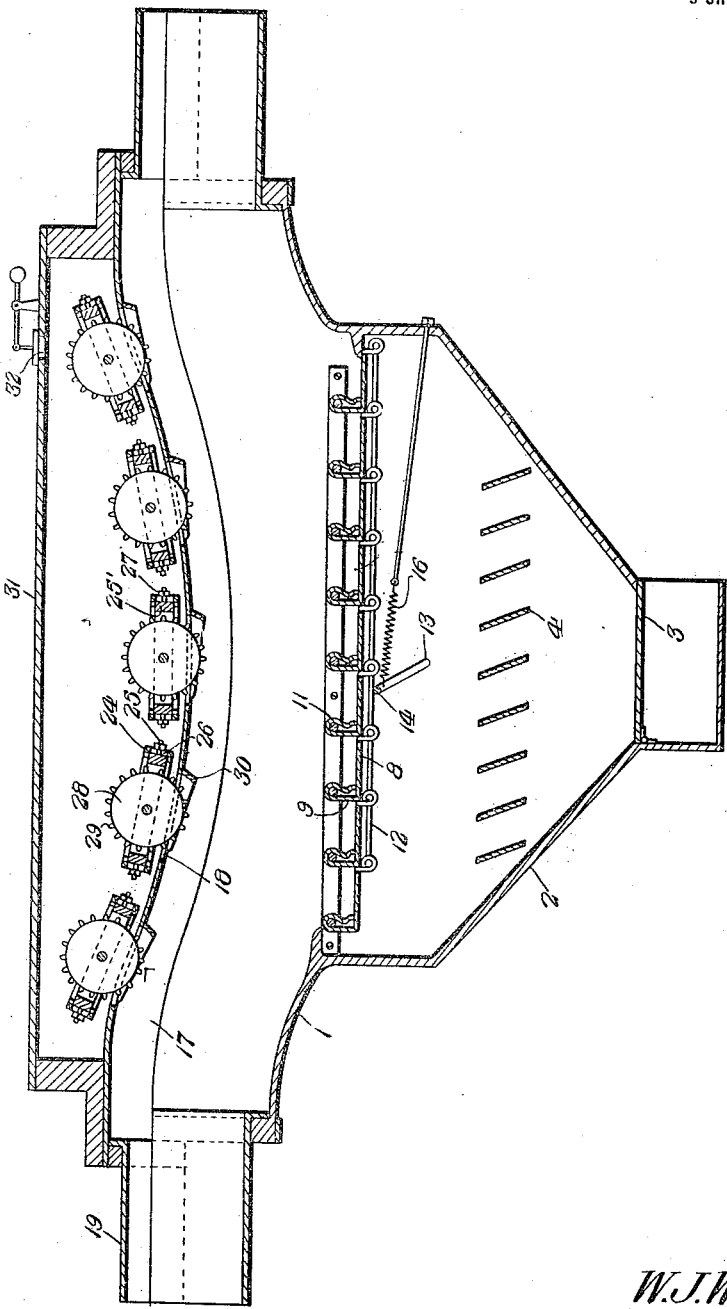

UNITED STATES PATENT OFFICE.

WILLIAM J. WHITE, OF BIRMINGHAM, ALABAMA.

AUTOMATIC SEED-COTTON CLEANER.

1,194,261. Specification of Letters Patent. Patented Aug. 8, 1916.

Application filed December 4, 1915. Serial No. 65,085.

*To all whom it may concern:*

Be it known that I, WILLIAM J. WHITE, a citizen of the United States, residing at Birmingham, in the county of Jefferson and State of Alabama, have invented new and useful Improvements in Automatic Seed-Cotton Cleaners, of which the following is a specification.

This invention relates to seed cotton cleaners and its consists in the novelty features hereinafter described and claimed.

An object of the invention is to provide a cleaner of the character indicated of simple and durable structure adapted to be applied to the seed pipe of a cotton gin and adapted to operate upon the seed cotton as it moves toward the gin in a manner to efficiently and effectively remove from the cotton particles of grit, metals, glass, twigs and other foreign substances that might be carried with the cotton.

With the above objects in view the cleaner comprises a body having a cover telescopically fitting thereon there being means provided for holding the cover at a fixed position with relation to the body. The body and cover are provided at their ends with flanges which overlap at their edge portions and adapted to fit the ends of pipe sections which convey the cotton from the source of supply to the gin. The cover is provided at its intermediate portion with a series of longitudinally disposed slots and wheels are adjustably mounted upon the cover and are provided with knobs located upon their peripheries. The lower portions of the wheels project through the said slots and the cover is provided with metallic fenders which lie in close proximity to the wheels and prevent the wheels from carrying the cotton up and depositing the same around the journal bearings of the wheels.

A series of perforated plates are pivotally mounted in the body and the plates below their pivots have depending solid portions which normally lie in vertical positions below the pivots. The said solid portions at their lower edges merge into the perforated portions of the plates which are intended to normally lie in horizontal position. Above the said solid portions and the pivots of the plates the said plates are provided with curls which are disposed below the intermediate portion of the cover and spaced from the same and the wheels carried thereby. Means is provided for simultaneously swinging all of the perforated plates whereby the perforated portions thereof may be moved from horizontal position to positions substantially at right angles to a horizontal line whereby the material which is gathered or deposited upon the plates may be permitted to gravitate into the lower portion of the body. The lower part of the body is formed in the shape of a hopper having inclined side walls and a series of baffle plates located in the lower portion of the body and are intended to prevent the air from passing below the plates in the form of eddies. The said body is provided at the lower point of its hopper with a valve which is intended to automatically open when the suction draft through the feed pipe and the gin is interrupted and hence any material which is deposited in the lower part of the body may gravitate from the same when the current of air through the feed pipe to the gin is interrupted. The body is provided at its side with a hinged panel which in turn is provided with a transparency through which the operation of the cleaner may be observed while it is in action.

In the accompanying drawings:—Figure 1 is a side elevation of the seed cotton cleaner. Fig. 2 is a longitudinal section view of the same, Fig. 3 is a top plan view with parts broken away. Fig. 4 is a transverse sectional view of the same. Fig. 5 is a perspective view of one of the plates. Fig. 6 is a similar view of one of the fenders.

The seed cotton cleaner comprises a body 1 which is substantially oblong in top plan and which is provided at its lowest side with a hopper 2 having downwardly converging side walls. A valve 3 is provided at the lower portion of the hopper 2 and is normally maintained in a closed position by the current of air which passes through the feed pipe to which the feed cleaner is connected when a current of air is passing through the said pipe. When the said current of air is interrupted the valve 3 opens by gravity and the material which has been collected in the hopper 2 may fall therefrom through the opening which is normally closed by the said valve. A number of spaced baffle plates 4 are located in the hopper 2 above the valve 3 and are intended to prevent the air which passes through the body from forming eddies in the hopper and thus interferring with the proper operation of the cleaner. The upper edge of the body 1 is bounded by an upstanding flange 5 upon which a cover (hereinafter described) is adapted to slidably fit. The body 1 is provided at its side with a hinged panel 6 which in turn is provided with a transparency 7 through which the operation of the cleaner may be observed while it is in action. The upper edge of the body is curved longitudinally as shown in Fig. 1 of the drawings and the deepest part of the said curve is at a point midway between the ends of the body.

Plates 8 are pivotally mounted in the body 1 above the upper portion of the hopper 2 and below the upper edges of the said body. The plates 8 are provided with depending solid portions 9 which are located below the pivots of the said plates and the said solid portions at their lower edges merge into angularly disposed perforated portions 10. The upper edges of the plates 8 above their pivots are curled as at 11. Spaced rods 12 are pivotally connected with the intermediate portions of the plates 8 and lie under the same. A shaft 13 is journaled in the opposite sides of the body 1 and the said shaft is provided within the body with a crank 14 which lies under the intermediate portions of the rods 12 and is adapted to raise or lower the same rods as the shaft 13 is turned. The shaft 13 is provided at one end with a handle 15 which is positioned exteriorly of the body 1 and which may be used for turning the shaft 13. A spring 16 is connected at one end with the body 1 and its other end with the crank of the shaft 14 and is under tension with a tendency to normally hold the crank 14 of the shaft in an elevated position whereby the rods 12 are supported so that they normally hold the perforated portions 12 of the plates 8 in approximately horizontal position and the solid portions 9 of the said plates in vertical positions. By using the handle 15 and turning the shaft 13 the crank 14 may be moved under the rods 12 so that the said rods may descend and consequently the perforated portions 10 of the plates 8 may swing from horizontal to vertical position and thus permit any matter or substance which has deposited upon their upper surfaces to gravitate into the hopper 2. As soon as the handle 15 is released the tension of the spring 16 comes into play whereby the shaft 13 is turned and the rods 12 are moved to carry the perforated portions 10 of the plates 8 to their horizontal or normal positions.

A cover 17 is adapted to fit snugly upon the flange 5 of the body 1 and the said cover is provided at its intermediate portions with a number of longitudinally disposed slots 18. Overlapping flanges 19 are provided at the ends of the body 1 and cover 17 and are adapted to fit the adjacent ends of pipe sections which constitute the feed pipe for supplying the cotton to a gin. Studs 20 are mounted at the sides of the body 1 and fork shaped members 21 are mounted at the sides of the cover 17 and the branches of the said forked shaped members receive the studs 20 between them. Nuts 22 are screw threaded upon the studs 20 and bear against the outer surfaces of the forked shaped members 21 and serve as means for fixing the cover 17 with relation to the body 1. Inasmuch as the flange 5 is slidably or telescopically received in the lower portion of the cover 17 the cover may be positioned at any suitable distance from the upper edge of the body 1 in order to permit the flanges 19 at the ends of the cover of the body to properly engage the pipe sections which may differ in diameter. Braces 23 are applied to the corners of the cover 17 and serve as means for bracing the end portions of the said cover with relation to the intermediate portions thereof. Bars 24 are located above the top of the cover 17 and are provided with slots 26, frames 25' are located between the bars 24 and carry bolts 25 which pass through the slots 26. Nuts 27 are screw threaded upon the said bolts and are adjusted to engage at their inner faces the surfaces of the bars 24, whereby the frames 25' may be held at adjusted positions with relation to the said bars.

Wheels 28 are journaled for rotation in the frames 24 and the said wheels are provided at their peripheries with outstanding knobs 29. Thin metallic shields 30 are positioned at the under side of the cover 17 and extend around the wheels 28 and serve as means for preventing the said wheels from carrying the cotton up through the slots 18. When the wheels 28 are projected through the slots 18 provided at the intermediate portion of the cover 17 and by adjusting the said frames vertically with relation to the cover the said wheels may be caused to project to a greater or less extent through the slots 18 in order to properly operate upon the cotton as it is passing toward the gin and to engage the same in a manner whereby it is agitated and the foreign particles of matter are removed therefrom and deposited upon the plates 8.

In operation the cotton is caused to pass through the body 1 from end to end thereof and under the cover under the influence of the current of air which is passing through the feed pipe of the gin and to which the cleaner is attached by means of the flanges 19. As the cotton comes into contact with the knobs 29 upon the wheels 28 the said wheels are turned and the passage of the cotton through the cleaner is checked but not completely interrupted. The turning of the wheels 28 and the action of the teeth 29 upon the cotton in conjunction with the curled portions 11 of the plates 2 has a tendency to knock foreign particles of sand, glass, sticks or other matter from the cotton and the said matter falls upon the perforated portions 10 of the plates 8 or passes through the perforations of the said portions and deposits in the hopper 2.

By reason of the fact that the plates 8 are provided with the depending solid portions 9 the said series of plates form a succession of comparatively deep pockets in which the foreign material may be collected and at times the shaft 13 may be turned as herein before described whereby the perforated portions of the plates 8 are swung from horizontal to approximately vertical position and the material collected thereon may gravitate into the hopper 2. The bars 24 are carried by a hood 31 which is detachably mounted on the cover 17 and which is provided with a valve controlled vent 32.

From the above description taken in conjunction with the accompanying drawings it will be seen that a cotton cleaner of simple and durable structure is provided and that the features thereof effectively cooperate to efficiently remove foreign substances or matter from seed cotton as the cotton is being moved along the feed pipe toward the gin. Furthermore it will be seen that means are provided for the adjusting of the wheels upon the cover with relation to the perforated plates in order that the cleaner may be adapted to operate upon volumes of cotton passing through pipes of different diameter. In view of the fact that the perforated plates 8 are located below the cover of the cleaner and form deep pockets the foreign substances above referred to are readily removed from the cotton and retained in the cleaner.

Having described the invention, what is claimed is:

1. A seed cotton cleaner comprising a body, a series of perforated plates pivotally mounted therein, means for normally holding the said plates in a closed position with relation to each other, a cover telescopically fitting upon the body, means for securing the cover at an adjusted position with relation to the body and a series of journaled wheels carried by the cover and provided with knobs located upon their peripheries.

2. A seed cotton cleaner comprising a body, a series of perforated plates pivotally mounted therein, said plates having below their pivots solid portions which normally lie approximately in vertical position, said plates being provided above their pivots with curled edges, means for normally holding the plates in closed position with relation to each other and a cover mounted upon the body and having a series of journaled wheels provided with knobs located upon their peripheries.

3. A seed cotton cleaner comprising a body, a series of perforated plates pivoted in the body, said plates having below their pivots solid portions and provided above their pivots with curled edges, rods located below the plates, a shaft journaled in the body and provided with a crank which lies under the rods and spring means connecting the crank of the shaft with the body and adapted to hold the plates normally in closed position with relation to each other.

4. A cotton cleaner comprising a body, perforated plates mounted therein, a cover telescopically fitted upon the body, means for securing the cover at an adjusted position with relation to the body, said cover having a series of longitudinally disposed slots and wheels journaled above the cover and having their lower portions projecting through the said slots.

5. A seed cotton cleaner comprising a body, perforated plates pivotally mounted in the body, a cover telescopically fitting upon the body, means for securing the cover at an adjusted position with relation to the body, the cover being provided at its intermediate portions with a series of longitudinally disposed slots, bars adjustably mounted upon the cover, wheels journaled in the bars and provided with knobs located upon their peripheries, the said wheels passing through the slots and means for securing the bars at adjusted positions with relation to the cover.

6. A seed cotton cleaner comprising a body, perforated plates located therein, a cover adjustably mounted upon the body, said cover being provided with a series of longitudinally disposed slots, bars adjustably mounted upon the cover, means for securing the bars at adjusted positions with relation to the cover, wheels journaled in the bars and projecting through the said slots, said wheels being provided with knobs located upon their peripheries and fender plates carried by the bars and fitting in close proximity to the wheels and adapted to prevent the wheels from carrying the cotton toward the axis upon which they are journaled.

In testimony whereof I affix my signature in presence of two witnesses.

WILLIAM J. WHITE.

Witnesses:
L. G. COLEY,
J. L. SUMTER.